(12) United States Patent
Elzur

(10) Patent No.: US 9,461,975 B2
(45) Date of Patent: *Oct. 4, 2016

(54) METHOD AND SYSTEM FOR TRAFFIC ENGINEERING IN SECURED NETWORKS

(71) Applicant: BROADCOM CORPORATION, Irvine, CA (US)

(72) Inventor: Uri Elzur, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,011

(22) Filed: Nov. 9, 2015

(65) Prior Publication Data

US 2016/0080335 A1    Mar. 17, 2016

Related U.S. Application Data

(63) Continuation of application No. 13/858,266, filed on Apr. 8, 2013, now Pat. No. 9,185,097, which is a continuation of application No. 11/939,910, filed on Nov. 14, 2007, now Pat. No. 8,418,241.

(60) Provisional application No. 60/865,725, filed on Nov. 14, 2006, provisional application No. 60/884,349, filed on Jan. 10, 2007, provisional application No. 60/896,590, filed on Mar. 23, 2007.

(51) Int. Cl.
| | |
|---|---|
| *H04L 29/06* | (2006.01) |
| *H04L 9/08* | (2006.01) |
| *H04L 9/32* | (2006.01) |

(52) U.S. Cl.
CPC ......... *H04L 63/0485* (2013.01); *H04L 9/083* (2013.01); *H04L 9/321* (2013.01); *H04L 9/3215* (2013.01); *H04L 9/3263* (2013.01); *H04L 63/062* (2013.01); *H04L 63/08* (2013.01); *H04L 63/0823* (2013.01); *H04L 63/164* (2013.01); *H04L 2209/76* (2013.01); *H04L 2209/80* (2013.01)

(58) Field of Classification Search
None
See application file for complete search history.

(56) References Cited

U.S. PATENT DOCUMENTS

| | | |
|---|---|---|
| 5,706,347 A | 1/1998 | Burke et al. |
| 6,055,236 A | 4/2000 | Nessett et al. |
| 6,115,376 A | 9/2000 | Sherer et al. |
| 6,446,200 B1 | 9/2002 | Ball et al. |
| 6,449,656 B1 | 9/2002 | Elzur et al. |
| 6,484,257 B1 | 11/2002 | Ellis |
| 6,499,107 B1 | 12/2002 | Gleichauf et al. |
| 6,631,416 B2 | 10/2003 | Bendinelli et al. |

(Continued)

*Primary Examiner* — Christopher Revak
(74) *Attorney, Agent, or Firm* — Oblon, McClelland, Maier & Neustadt, L.L.P.

(57) ABSTRACT

Aspects of a method and system for traffic engineering in an IPSec secured network are provided. In this regard, a node in a network may be authenticated as a trusted third party and that trusted third party may be enabled to acquire security information shared between or among a plurality of network entities. In this manner, the trusted third party may parse, access and operate on IPSec encrypted traffic communicated between or among the plurality of network entities. Shared security information may comprise one or more session keys utilized for encrypting and/or decrypting the IPSec secured traffic. The node may parse IPSec traffic and identify a flow associated with the IPsec traffic. In this manner, the node may generate and/or communicate statistics pertaining to said IPSec secured traffic based on the flow with which the traffic is associated.

20 Claims, 5 Drawing Sheets

(56) References Cited

U.S. PATENT DOCUMENTS

| | | |
|---|---|---|
| 6,931,530 B2 | 8/2005 | Pham et al. |
| 7,000,120 B1 | 2/2006 | Koodli et al. |
| 7,028,183 B2 | 4/2006 | Simon et al. |
| 7,028,186 B1 | 4/2006 | Stenman et al. |
| 7,073,073 B1 | 7/2006 | Nonaka et al. |
| 7,103,770 B2 | 9/2006 | Conrath |
| 7,143,439 B2 | 11/2006 | Cooper et al. |
| 7,194,766 B2 | 3/2007 | Noehring et al. |
| 7,243,143 B1 | 7/2007 | Bullard |
| 7,251,215 B1 | 7/2007 | Turner et al. |
| 7,272,646 B2 | 9/2007 | Cooper et al. |
| 7,280,540 B2 | 10/2007 | Halme et al. |
| 7,334,125 B1 | 2/2008 | Pellacuru |
| 7,343,599 B2 | 3/2008 | Panjwani |
| 7,366,894 B1 | 4/2008 | Kalimuthu et al. |
| 7,370,348 B1 | 5/2008 | Patel et al. |
| 7,382,881 B2 | 6/2008 | Uusitalo et al. |
| 7,493,393 B2 | 2/2009 | Narayanan |
| 7,519,721 B2 | 4/2009 | Godwin et al. |
| 7,533,409 B2 | 5/2009 | Keane et al. |
| 7,565,538 B2 | 7/2009 | Gray et al. |
| 7,596,614 B2 | 9/2009 | Saunderson et al. |
| 7,613,920 B2 | 11/2009 | Gustave et al. |
| 7,624,263 B1 | 11/2009 | Viswanath et al. |
| 7,624,431 B2 | 11/2009 | Cox et al. |
| 7,774,831 B2 | 8/2010 | Kuznetsov et al. |
| 7,788,700 B1 | 8/2010 | Feezel et al. |
| 7,814,311 B2 | 10/2010 | Convery et al. |
| 7,826,393 B2 | 11/2010 | Okita et al. |
| 7,826,614 B1 | 11/2010 | Kaniz et al. |
| 7,917,948 B2 | 3/2011 | Kalimuthu et al. |
| 8,418,241 B2 | 4/2013 | Elzur |
| 8,549,617 B2 | 10/2013 | Wei et al. |
| 8,850,200 B1 | 9/2014 | Horgan |
| 8,943,000 B2 | 1/2015 | Koodli et al. |
| 9,185,097 B2 * | 11/2015 | Elzur ................. H04L 63/08 |
| 2002/0083344 A1 | 6/2002 | Vairavan |
| 2002/0104020 A1 | 8/2002 | Strahm et al. |
| 2002/0124090 A1 | 9/2002 | Poier et al. |
| 2002/0157024 A1 | 10/2002 | Yokote |
| 2002/0161905 A1 | 10/2002 | Haverinen et al. |
| 2003/0061506 A1 | 3/2003 | Cooper et al. |
| 2003/0212901 A1 | 11/2003 | Mishra et al. |
| 2005/0188220 A1 | 8/2005 | Nilsson et al. |
| 2006/0036733 A1 | 2/2006 | Fujimoto et al. |
| 2006/0098673 A1 | 5/2006 | Rabinovitch et al. |
| 2006/0173968 A1 | 8/2006 | Vaarala et al. |
| 2006/0177061 A1 | 8/2006 | Orsini et al. |
| 2006/0248586 A1 | 11/2006 | Delaney et al. |
| 2006/0262808 A1 | 11/2006 | Lin et al. |
| 2007/0074018 A1 | 3/2007 | Edwards |
| 2007/0101122 A1 | 5/2007 | Guo |
| 2008/0092214 A1 | 4/2008 | Zaralkousky et al. |
| 2008/0226071 A1 | 9/2008 | Braskich et al. |
| 2009/0113203 A1 | 4/2009 | Tsuge et al. |
| 2010/0095368 A1 | 4/2010 | Niu et al. |
| 2010/0257598 A1 | 10/2010 | Demopoulos et al. |
| 2011/0113236 A1 | 5/2011 | Chenard et al. |
| 2012/0011360 A1 | 1/2012 | Engels et al. |

* cited by examiner

METHOD AND SYSTEM FOR TRAFFIC ENGINEERING IN SECURED NETWORKS

CROSS-REFERENCE TO RELATED APPLICATIONS/INCORPORATION BY REFERENCE

This application is a continuation of U.S. patent application Ser. No. 13/858,266, filed Apr. 8, 2013 (now U.S. Pat. No. 9,185,097), which is a continuation of Ser. No. 11/939,910, filed Nov. 14, 2007, which is now U.S. Pat. No. 8,418,241, and makes reference to, claims priority to and claims benefit from: U.S. Provisional Patent Application Ser. No. 60/865,725, filed on Nov. 14, 2006; U.S. Provisional Patent Application Ser. No. 60/884,349, filed on Jan. 10, 2007; and U.S. Provisional Patent Application Ser. No. 60/896,590, filed on Mar. 23, 2007.

Each of the above stated applications is hereby incorporated herein by reference in its entirety.

FIELD OF THE INVENTION

Certain embodiments of the invention relate to communication networks. More specifically, certain embodiments of the invention relate to a method and system for traffic engineering in IPsec Secured Networks.

BACKGROUND OF THE INVENTION

At the network layer, today's enterprise networks predominantly utilize the Internet Protocol (IP). To enhance network security at the network layer, a suite of protocols collectively referred to as IPsec was developed and is utilized along with one or more key exchange protocols as a way to provide source authentication, data integrity, and/or data confidentiality of IP datagrams transmitted in a network. In this regard, IPsec may provide end-to-end security of data in a network.

When utilizing IPsec, a source node must first establish a logical connection, known as a security association (SA), with a destination node. A security association is a unidirectional connection between the two end nodes and is characterized by the security protocol identifier (AH or ESP), the destination IP address, and a security parameter index (SPI). In this manner, the source node can transmit secure data over the network to the destination node utilizing either the Authentication Header (AH) protocol or the Encrypted Security Payload (ESP) protocol.

Although IPSec may enhance security of a network, deployment of IPSec in existing network infrastructures may be difficult and/or costly due to incompatibility of network devices and due to the fact that when data confidentiality is invoked, packet headers and/or payload may be encrypted.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for Traffic Engineering in IPsec Secured Networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE PREFERRED EMBODIMENTS

Certain embodiments of the invention may be found in a method and system for traffic engineering in IPsec Secured Network. In various embodiments of the invention, a node in a network may be authenticated as a trusted third party; and that trusted third party may be enabled to acquire security information shared between a plurality of network entities. In this manner, the trusted third party may parse IPSec authenticated and/or encrypted traffic communicated between the plurality of network entities. Shared security information may comprise one or more session keys utilized for authenticating and/or encrypting and/or decrypting the IPSec secured traffic. Each of the nodes may register with a trusted entity in a network domain of interest (e.g., a management entity, an administrative control, and/or a directory service. The trusted entity may authenticate the node as a trusted third party and determine what security information the third party should have access to. Additionally, one or more of the network entities may authenticate the node and share the security information with the node via one or more secure channels. In this regard, the entities may authenticate the node based on a certificate provided to the node by a directory service or by establishing trust bilaterally. The network entities may be queried to provide explicit approval prior to authenticating the node as a trusted third party. The node may parse IPSec traffic and identify a flow associated with the IPsec traffic. In this manner, the node may generate and/or communicate statistics pertaining to said IPSec secured traffic based on the flow with which the traffic is associated or on any other granularity (e.g., all traffic between two end points). The IPSec traffic that the node parses may be determined based on a time division multiplexing scheme. The security information may be exchanged between the network entities and the node via a three-way key negotiation protocol.

In various embodiments of the invention, a node may be authenticated as an authorized third party and security information such as session keys may be transmitted to the authenticated node. However, in instances where the node may not be provided with security information, an end point sending encrypted traffic to a peer may also send flow information pertaining to the encrypted traffic. In this manner, the node may still process the traffic based, for example, on source and destination addresses and/or based on a flow with which the traffic is associated even though the node may be unable to decrypt the traffic.

Figure 1:
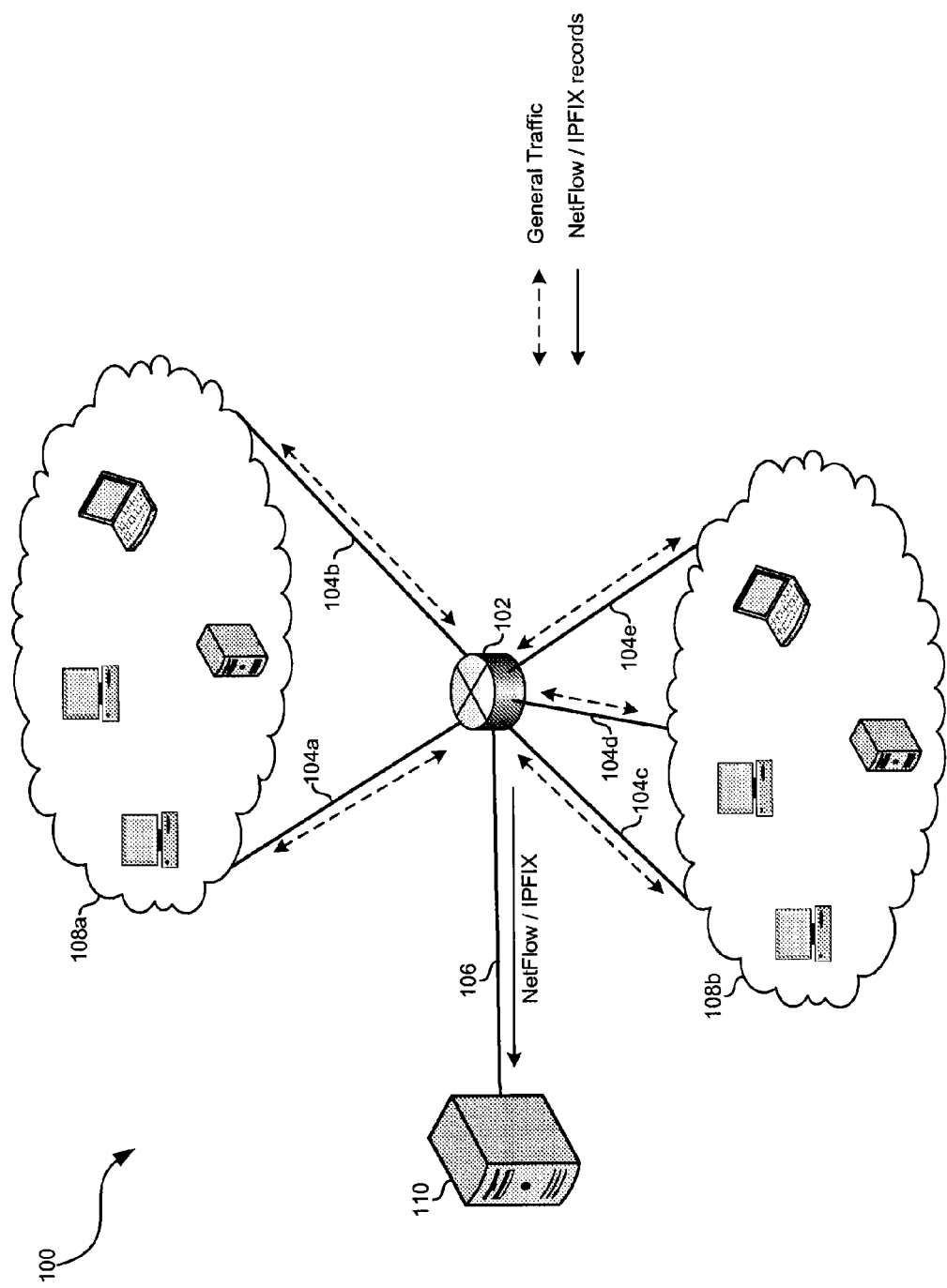
FIG. 1 is a diagram illustrating monitoring of network activity in a network node, in accordance with an embodiment of the invention.

FIG. 1 is a diagram illustrating monitoring of network activity in a network node, in accordance with an embodiment of the invention. Referring to FIG. 1 there is shown a network 100 comprising sub-networks 108a and 108b, physical links 104a through 104f, network node 102, and server 110.

The sub-network 108a may be communicatively coupled to the node 102 via the physical links 104a and 104b. Similarly the sub-network 108b may be communicatively coupled to the node 102 via the physical links 104c, 104d, and 104e. Additionally, the node 102 may be communicatively coupled to the server 110 via the physical link 106.

The physical links 104a through 104f may enable communication between the node 102 and the clouds 108a and 108b. In an exemplary embodiment of the invention, the links 104a through 104f may comprise twisted pair cables, coaxial pair cables, and/or wireless channels.

The sub-networks 108a and 108b may comprise one or more network nodes communicatively coupled via one or more physical links. The nodes may, for example, comprise computers, servers, routers, switches, and the links may comprise twisted pair cables, coaxial pair cables, and/or wireless channels. In an exemplary embodiment of the invention each sub-network 108a and 108b may represent an organizational unit in an enterprise network 100.

The network node 102 may comprise suitable logic, circuitry, and/or code that may enable communicating traffic between the sub-networks 108a and 108b and inspecting the traffic communicated between the sub-networks 108a and 108b. In this regard, the node 102 may, for example, be enabled to identify flows in the network 100 and determine information pertaining to those flows. For example, a flow may be identified as packets received within a time interval having a common source address, destination address, and protocol. The node 102 may utilize flow information for traffic engineering which may comprise implementing one or more traffic control policies such as allowing access to the network or to specific resources or services on the network and/or filtering, classifying, profiling, and/or prioritizing packets based on a flow with which the packets are associated.

In various embodiments of the invention, the node 102 may implement one or more protocols such as NetFlow or IPFIX for communicating flow information to the server 110 via the link 106. To determine flow information, the node 102 may parse packets it receives and store information about the parsed data in a memory. Furthermore, the stored data may be conveyed to the server 110 via the link 106, for example. In this regard, the node 102 may extract, generate, and/or export network flow information. The node 102 may be referred to as an inspection point.

The server 110 may comprise suitable logic, circuitry, and/or code that may enable receiving and/or processing flow information. In this regard flow information may be utilized for a variety of network management and administrative functions. In this regard, the server 110 may be referred to as a collector of network flow information. In various other embodiments of the invention, the node 102 may collect and/or process the network flow information.

In an exemplary operation, the node 102 may parse a packet arriving from the sub-network 104a or 104b to identify a flow with which the packet may be associated. Based on established policies for the network and/or the identified flow, which may, for example, be set by a network administrator, local policies, and/or policies provided by a directory repository, the packet may be dropped, forwarded, and/or further processed by the node 102. Additionally, the node 102 may periodically export flow information to the server 110.

In instances when an IPsec secured packet arrives at the node 102, the node 102 may require one or more session keys in order to parse the packet. Accordingly, aspects of the invention may enable establishing the node 102 as an authorized third party (an inspection point) and providing IPSec session keys to the node 102. In this regard, aspects of the invention may enable extending one or more protocols such as Kerberos to provide session keys to authorized third parties (inspection points) such as the switch 102. Accordingly, when equipped with session keys, the node 102 may be enabled to parse IPsec traffic and provide flow information while maintaining an end-to-end IPSec security association. Additionally, when equipped with session keys, the node 102 may be enabled to implement one or more security functions such as authenticating a source of a packet, prior to forwarding the packet. In various embodiments of the invention, a limited number of session keys may be allowed, and the number of keys may be pre-configured, actively managed, or directory driven. For example, in directory driven key management, a central database or sever may be referenced to determine the number of keys which may be provided to the node 102.

Aspects of the invention may enable explicitly querying an end point, an application, and/or a user as to which keys may be provided to the node 102. In this manner, an end point, (or a trusted entity within an end point such as an operating system, a hypervisor, a trusted platform module (TPM), a network interface card (or similar device), an application, and/or a user may explicitly accept or reject the request to provide session keys to the node 102. Similarly, there may be instances (such as in an enterprise network seeking to prevent "inside threats") where an application, an end point, and/or user may be unaware of the inspection point. In this regard, knowledge and/or authorization of the node 102 to inspect traffic may be determined by policies which may be set by a network administrator, local policies, and/or policies provided by a directory repository. For example, an inspection point may be configured/controlled to inspect a specific section of the network based on, for example, functionality, virtual local area networking (VLAN), IP subnets, etc. Additionally, in instances that a server or network resource may be more trusted than a client, the node 102 may be limited to receiving session keys from the server or resource rather than from the client.

In order to determine flow information, the IPSec traffic may have to be decrypted. Various aspects of the invention may enable protecting this information inside the node 102. For example, session keys and/or other sensitive information may be protected in hardware and restricted to a cryptographically secured location. In this regard, additional details of the node 102 are described with respect to FIG. 3. Additionally, decrypted data may be prevented from being forwarded or may be restricted to a specific set of one or more trusted ports or network nodes. In another embodiment of the invention, decryption may be limited to, for example, only packet headers or packet headers and a pre-determined number of payload bytes. In this regard, the inspection point may be configurable, based on network policies, to control what portions of a packet may be decrypted and made available to the inspection point or another third party. In various embodiments of the invention, the inspection point may have to decrypt the whole packet in order to process relevant information stored in the packet's "trailer", however, the information exposed outside the unit performing the decryption, may be limited as described above.

Figure 2:
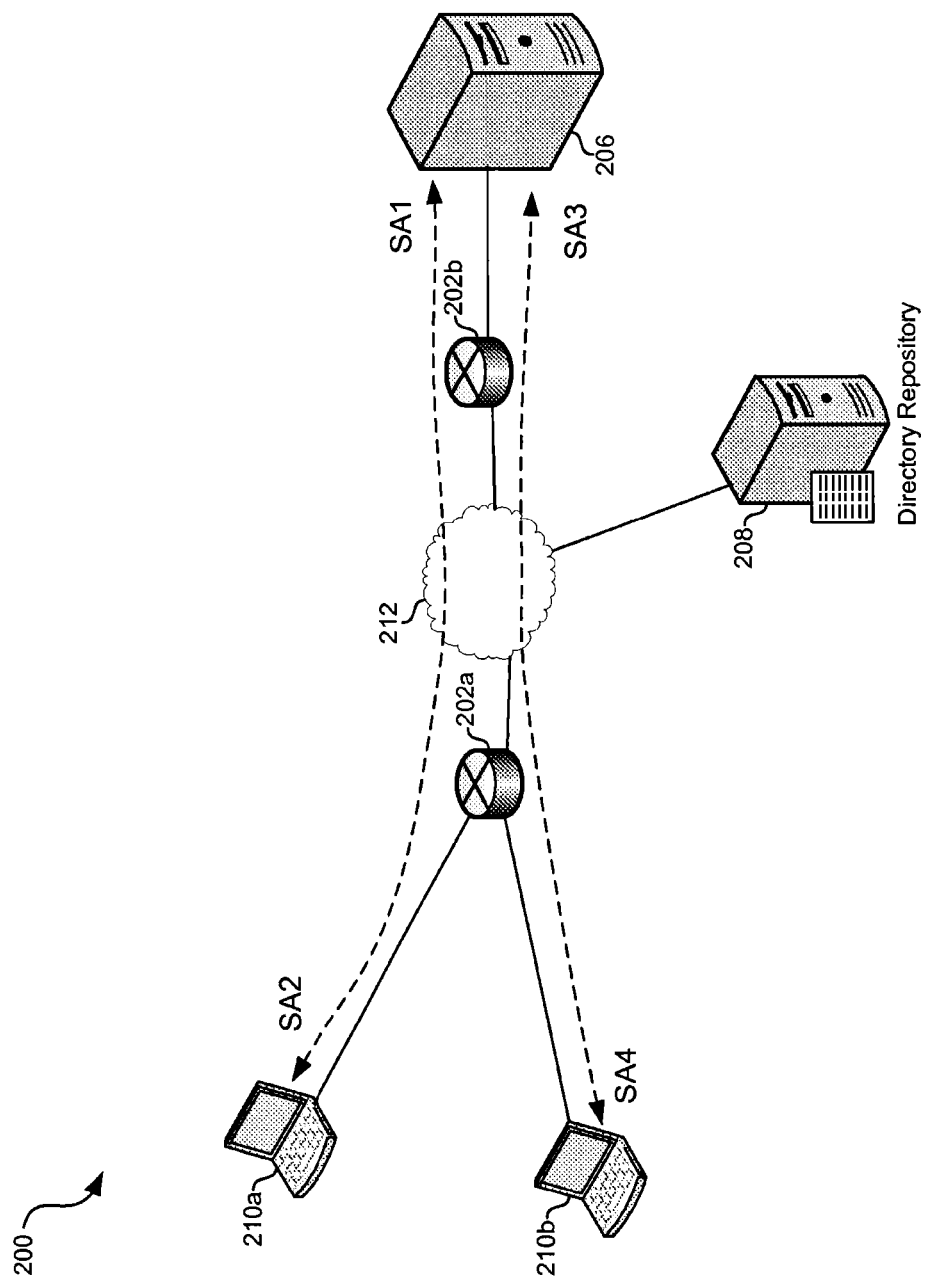
FIG. 2 is a diagram illustrating an exemplary IPSec network enabled for inspection of IPSec traffic by an authorized third party node, in accordance with an embodiment of the invention.

FIG. 2 is a diagram illustrating an exemplary IPSec network enabled for inspection of IPSec traffic by an authorized third party node, in accordance with an embodiment of the invention. Referring to FIG. 2 there is shown clients 210a and 210b (may also be referred to as end points), nodes 202a and 202b, sub-network 212, server 206 (may also be referred to as an end point), and directory repository 208.

The clients 210a and 210b may comprise suitable logic, circuitry, and/or code that may enable transmitting and receiving data utilizing one or more IPSec security associations (SA). In this regard, the clients may, for example, comprise computers or workstations communicating with the server 206 over an IPSec secured network.

The nodes 202a and 202b may be as described with respect to FIG. 1. In this regard, the nodes 202a and 202b may be enabled to identify flows and filter, forward, ad/or otherwise process packets based on a flow to which the packets belong. Accordingly, for IPSec secured packets, aspects of the invention may enable the nodes 202a and 202b to obtain session keys such that encrypted packets may be parsed.

The sub-network 212 may be similar to or the same as the sub-networks 104a and 104b as described with respect to FIG. 1. In this regard, the sub-network 212 may comprise one or more network nodes and/or physical links.

The server 206 may comprise suitable logic, circuitry, and/or code that may enable transmitting and receiving data utilizing an IPSec SA. In this regard, server 206 may, for example, communicate with a remote client over an IPSec secured network. Accordingly, the server 206 may host one or more secure resources (e.g., software applications).

The directory repository 208 may comprise suitable logic, circuitry, and/or code that may enable storing and/or hosting one or more directory services. In this regard, the directory service(s) may store and/or organize information about the network such as network users, network resources, resource permissions, etc.

In an exemplary operation, the client 210a may communicate securely with the server 206 utilizing security associations SA1 and SA2. Similarly, the client 210b may communicate securely with the server 206 utilizing security associations SA3 and SA4. The node 202a may comprise an inspection point for traffic to/from the clients 210a and 210b. In order to inspect traffic between the clients 210a, 210b and the server 206, the node 202a may need one or more session keys associated with the security associations SA1, SA2, SA3, and SA2. In this regard, the inspection point may be configured to inspect traffic in one direction (e.g., SA1 and/or SA3 session keys) or both directions (e.g., SA1 and SA2 and/or SA3 and SA4 session keys). Upon receiving appropriate session keys, the node 202a may inspect traffic that is part of SA1 and/or SA2, and may implement traffic engineering (e.g., forwarding, filtering, classifying, profiling, processing, etc.) as per network policies.

In an exemplary embodiment of the invention, the node 202a may register as an inspection point with a directory service on the repository 208 and the directory service may authenticate the node 202a. For example, the directory service may digitally sign a certificate, which may provide an indication that the node 202a may be an authorized inspection point and types of permission/access that the inspection point may be granted. Accordingly, the node 202a may present its certificate to the clients 210a, 210b and/or to the server 206, and the clients 210a, 210b and/or the server 206 may securely communicate one or more session keys to the node 202a.

In another exemplary embodiment of the invention, the clients 210a and 210b may share session keys with the repository 208 and the repository may provide appropriate session keys to the node 202a.

In another exemplary embodiment of the invention, a key negotiation protocol (e.g., Kerberos, IKE, KINK, etc.) may be extended to allow a certified and authenticated inspection point to get a copy of the agreed upon session key(s). In this regard, a three-way key negotiation may take place between a client (e.g., 210a), a network peer (e.g., the server 206), and the inspection point (node 202a). Moreover, aspects of the invention may enable other remote third party nodes to authenticate themselves to the inspection point and acquire session keys from the inspection point. The inspection point may require cryptographic authentication of the remote third party node and may restrict which entities it provides keys to. For example, an inspection point may provide keys only via a local port, only to directory repositories, and/or only to a pre-authenticated management entity. In this regard, security of the keys may be improved by restricting configuration of the behavior to local configuration or a third party that was locally configured.

In various embodiments of the invention, session keys may be periodically updated. Accordingly, aspects of the invention may enable notifying and/or updating the node 202a when session keys are changed. In this regard, session keys may be updated via a secure channel for instance by any or both end points, directory services, or a network management entity.

In various embodiments of the invention, the number of security associations the node 202a needs to be aware of may be limited by temporally alternating the traffic that the node 202a inspects during a time interval. For example, during a first time interval the node 202a may possess session keys for SA1 and SA2 and may inspect traffic to/from the client 210a and during a second time interval, the node 202a may possess session keys for SA3 and SA4 and may inspect traffic to/from the client 210b. In this manner, resources and costs required for the node 202a may be controllable and scalable. Although a simplistic case of two clients and two security associations is provided, temporally changing which data is inspected may be extended to include any number of inspection points, clients, security associations, time intervals, etc.

In another embodiment of the invention, an authorized third party node (inspection point) may be enabled to determine flow information of IPSec encrypted flows without knowledge of corresponding session keys. In this regard, a trust relationship between an end point and an inspection point may be used to convey information between the end point and the inspection point that may allow collection of flow related information by the inspection point. In this manner, the inspection point may enforce network policies, provide essential statistics, communicate with management entities, and/or otherwise process traffic based on flow information even if it can't access packet contents due, for example, to encryption and/or unknown packet headers. In this manner, the end point may send the inspection point information pertaining to each flow including but not limited to source and destination IP addresses, upper protocol ports, some keywords used, a result of a search (e.g., for a keyword) into the payload (prior to encryption), and/or requested bandwidth. The inspection point may decide on network admittance, allowed bandwidth, Quality of Service (QoS) or class of service (CoS) and enforce traffic engineering policies without a need to access packet contents. In this manner, an end point may comprise a network interface hardware device or similar hardware/functionality that may act as extension of the inspection point. In this regard, traffic engineering functions and/or operations may be distributed throughout various nodes in a network and the secure information which may be shared with an authorized third party node may differ depending on the network, the traffic, the situation, etc. Aspects of the invention may enable a NIHW device or similar hardware on the end point to act as an extension of the inspection point without software assistance and/or with limited software assistance. A NIHW device may be a stand alone device, integrated into the chipset or into the processor, for example.

A solution to network admittance has also been tried with multiple protocols. The IEEE 802.1x is used to let a machine authenticate itself to the network. However a major short coming of IEEE 802.1x is that the switch port is open to all traffic after one MAC address has been authenticated to it. This may allow another device with a different MAC address or a device sharing the switch port (e.g. by adding another switch or hub in front of the authenticating 802.1x switch, on the client side) to access the network. Accordingly, network admittance control may be improved by the switch checking the source MAC address on every frame and discarding, limiting access, or sending to remediation any frames with an unauthorized source MAC address. In this manner, the switch may enforce use of the same MAC address on the port as the one that has been used with IEEE 802.1 authentication, in instances where it may possess the capability to check the source MAC address on a per frame basis. Support of more than one MAC address, however, may require hardware change and a protocol change to standardize it. Additionally, as some operating systems or hypervisors, for example, may desire to override a MAC address programmed into a NIHW device or a MAC address utilized for 802.1x authentication, aspects of the invention may provide a secure way to alter with MAC address while still controlling network admittance.

Enforcing the use of a port for only traffic from an authenticated MAC address, however, may not protect against MAC address spoofing. Accordingly, an alternative solution for controlling network admittance may be utilized. In this regard, a trust established between an inspection point, such as the node 202a, and end point (or, for example, an endpoint's NIHW device), such as the end point 210a, may be utilized to enhance security in a network by augmenting MAC based (e.g. 802.1x) protocols. In this regard, the inspection point 202a may establish trust with the end point 210a via an 802.1x challenge/response, or by another secure protocol, such that the end point 210a may authenticate itself to the inspection point 202a. The inspection point 202a may also challenge the end point 210a using another protocol to verify that the end point 210a has the credentials to obtain network access. For example, the inspection point 202a may be used to challenge the end point 210a for every MAC address to authenticate the address and/or deny/remediate network access. In another example, hardware and/or software in the end point 210a may establish trust with the inspection point 202a and may serve as an enforcing point for all addresses it sends to the network.

In order to ensure robustness and security, the end point 210a may employ specific trust-worthy API with trusted entities such as a hypervisor, an operating system assisted with a security root (e.g. TPM), or use of pre-programmed MAC addresses, for example. Similarly, the inspection point 202a may act as a proxy between the end point 210a and a network access control device (which may, for example, reside in the sub-network (212). In this manner, the end point 210a may only need be compatible with the inspection point 202a as opposed to a multitude of protocols used by various network access control devices. In one embodiment of the invention, a NIHW device in the end point may act as a proxy without software assistance from a host, which may improve security aspects of node authentication.

Figure 3:
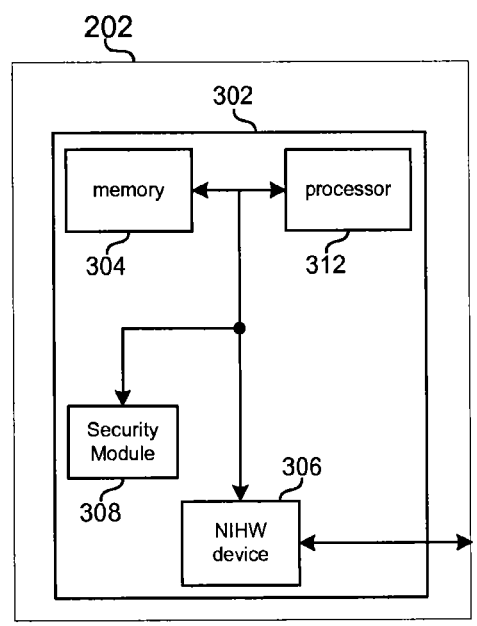
FIG. 3 is a block diagram of an exemplary network node which may be enabled to inspect IPSec secured network traffic, in accordance with an embodiment of the invention.

FIG. 3 is a block diagram of an exemplary network node which may be enabled to inspect IPSec secured network traffic, in accordance with an embodiment of the invention. Referring to FIG. 3, there is shown a node 202 which may comprise a processing core 302. The processing core 302 may comprise a memory 304, a network interface hardware (NIHW) device 306, a security module 308, and a processor 312.

The memory 304 may comprise suitable logic, circuitry, and/or code that may enable storing information utilized for processing packets. In this regard, the memory may enable storing routing tables, supported protocols, and/or other information utilized to process traffic in the node 202. Additionally, the memory 304 may be used to buffer data, store temporary data, etc.

The NIHW device 306 may comprise suitable logic, circuitry, and/or code that may enable reception and/or transmission of packets in a network. In this regard, the NIHW device 306 may enable reception and/or transmission of bits over a physical medium and may enable communicating the received bits to the processor 312, the memory 304, and/or the security module 308. In various embodiments of the invention, the NIHW may comprise a plurality of ports for interfacing to a plurality of physical links. In various embodiments of the invention, the NIHW 306 may assume some of the functions described herein as performed by the processor 312, memory 304, and/or the security module 308.

The security module 308 may comprise suitable logic circuitry and/or code that may enable authentication, validation, encryption, and/or decryption of data. In this regard, the data may be received via the NIHW device 306 and/or may be internally generated in the processing core 302. Accordingly, the security module 308 may enable generating and sharing secured keys which may be utilized for a number of security protocols. In an exemplary embodiment, the security module 308 may comprise a factory installed device ID which may be generated utilizing a true hardware random number generator and may be protected so it may never leave a secure hardware boundary. In this manner, the security module 308 may support numerous security protocols including, but not limited to, IPsec protocols.

In various embodiments of the invention, the security module 308 may manage session keys such that keys may be deleted, renewed, and/or refreshed as determined by network administration policies and/or based on communication with a directory service and/or communication with one or more endpoints. In various embodiments of the invention, the security module 308 may store and/or control one or more routing tables utilized by the node 202. In this regard, the session keys and/or routing tables may be protected from attacks which could cause decrypted IPSec data to be forwarded to an unauthorized destination. In various embodiments of the invention, the security module 308 may be integrated, combined, or may share hardware and/or software with the processor 312 and/or the NIHW 306.

The processor 312 may comprise suitable logic, circuitry, and/or code that may enable interfacing with the memory 304, the NIHW device 306, and the hardware security module 308 to generate, receive, process, and/or forward packets. In this regard, the processor 312 may provide control signals and/or instructions to the memory 304, the NIHW device 306, and the hardware security module 308. The processor 312 may execute instructions that may enable parsing received packets, assembling packets to be transmitted, storing and accessing information in the memory 304, generating and/or accessing security keys utilizing the hardware security module 308, receiving data from the NIHW device 306, sending data to the NIHW device 306, and communicating with an endpoint and/or directory repository to obtain and manage session keys.

In operation the NIHW device 306 may receive symbols over a physical medium, convert the symbols to bits, assemble the bits into packets, and convey the packets to the memory 304, the processor 312, and/or the security module 308. For general traffic, the processor may parse a packet and identify a flow with which the packet is associated. Accordingly, flow information may be generated and may be stored in the memory 304. Periodically, the stored flow information may be assembled into a flow record placed into one or more packets. Assembled packets may be conveyed to the NIHW device 306 which may convert the bits into physical symbols for transmission over a physical medium. In instances where received packets were transmitted utilizing a security association, assembled packets may be conveyed to the security module where session keys may be stored and the received packets may be decrypted. In this regard, a flow with which a packet is associated may be determined and relevant session keys for that flow may be obtained from local storage, from the endpoints, and/or from the directory repository such that packet content may be decrypted. In various embodiments of the invention, the decrypted data may not be available outside of the security module. In other embodiments of the invention, decrypted data may be restricted to one or more specified trusted ports. Additionally, decrypted data and/or flow records pertaining to the decrypted data may be communicated utilizing one or more security associations.

In various embodiments of the invention, the node 202 may be enabled to function as a network access control device, and may grant access based on a flow classification, credits, end point authentication and/or other criteria (e.g. health) of the endpoint and/or one of them.

In various embodiments of the invention, different network security protocols may use different methods to establish trust and deliver session keys, but may use the same cryptographic engines to encrypt ad/or decrypt and/or authenticate the frame. For instance, AES GCM or GMAC may be employed by both IPsec and MACsec protocols. Accordingly, the node 202 may also be used to convert between two such security protocols where a first security protocol may be used on an ingress port and a second security protocol may be used on a egress port. In this manner, a shared cryptographic engine may be controlled to encrypt/decrypt and/or authenticate traffic based on the protocol used.

In various embodiments of the invention, one or more lines of code in the node 102 may be verified in order to detect if the node 102 has been tampered with. In this regard, a digital signature (e.g. cryptographic hash) of the code in the node 102 may be verified periodically and/or at determined times/occasions.

Figure 4A:
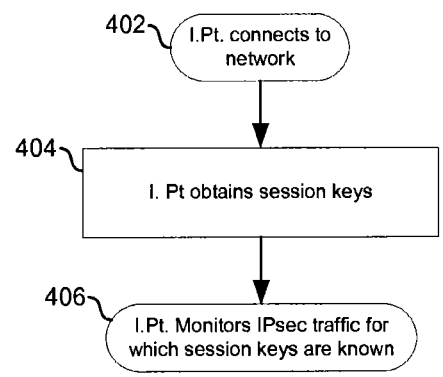
FIG. 4a is a flow chart illustrating exemplary steps for inspecting traffic in an IPSec secured network, in accordance with an embodiment of the invention.

FIG. 4A is a flow chart illustrating exemplary steps for inspecting traffic in an IPSec secured network, in accordance with an embodiment of the invention. Referring to FIG. 4A the exemplary steps may begin with step 402 when an inspection points, such as the node 102, is connected to a network. In this regard, the node 102 may be physically connected to the network via one or more physical links, such as the links 104a through 104f. Subsequent to step 402, the exemplary steps may advance to step 404. In step 404 session keys may be provided to and/or obtained by the inspection point. In various embodiments of the invention, manual configuration, a secure channel (e.g. TLS, SSL, or IPSec), and/or communication with an endpoint may be utilized for the inspection point to obtain session keys from a directory service (e.g., as described with respect to FIG. 4B) and/or an end point (in instances where a directory service may not be present or not enabled to support session keys distribution to the inspection point).

In various embodiments of the invention, however, one or more conventional two-peer key negotiation protocols may be extended to allow a three-peer negotiation such that the inspection point may be involved in the key negotiation. In this regard, the inspection point may present one or more credentials to end points with which keys are being negotiated. Additionally, if and when keys expire and/or need to be refreshed, an end point, directory service, or other node that generates the new key may be responsible for notifying and/or updating the inspection point as to the new keys and when the new keys go into effect. In this regard, network administration policies, for example, may determine a maximum lifespan of a session key, and/or designated times when keys may be revoked and new keys required. Subsequent to step 404, the exemplary steps may advance to step 406. In step 406, the inspection point may begin parsing IPSec traffic for which keys have been provided. In this manner, the inspection point may identify flows comprising the IPSec traffic and may implement filtering, forwarding, processing, etc., as per network policies.

Figure 4B:
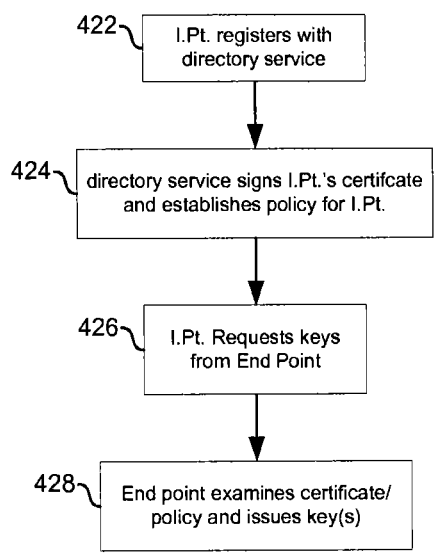
FIG. 4B is a flow chart illustrating exemplary steps for inspection of IPSec traffic by an authorized third party node, in accordance with an embodiment of the invention.

FIG. 4B is a flow chart illustrating exemplary steps for obtaining session keys for inspection of IPSec traffic by an authorized third party node, in accordance with an embodiment of the invention. In step 422, the node (e.g., node 202a or 202b of FIG. 2) may register with a directory service (e.g., Active Directory on the repository 208 of FIG. 2) as an inspection point. In this regard, aspects of the invention may enable addition of a classification of inspection point as an object type that may be listed in a directory service. Subsequent to step 422, the exemplary steps may advance to step 424. In step 424, the directory service may authenticate the node (e.g., node 202b) as a valid and trusted inspection point and may, for example, digitally sign a certificate authenticating the node. The directory service may establish permissions for the inspection point (e.g., what session keys the inspection point should have access to) based on network administration policies. In this regard, the directory service may determine that an inspection point should receive all keys, or a subset of the keys, based on factors such as determined network administration policies, and/or nature of the request from the inspection point. For example, which keys may be provided to the Inspection point may be determined, at least in part, based on an origination or destination subnet, and/or based on an originating or target application. Subsequent to step 424, the exemplary steps may advance to step 426. In step 426, the inspection point may request IPSec SA session keys from an end point. In this regard, the inspection point (e.g., node 202b) may present its certificate to the end point (e.g., 210b of FIG. 2). Subsequent to step 426, the exemplary steps may advance to step 428. In step 428, the end point may inspect the certificate issued by the directory service to authenticate the inspection point.

Once the end point has authenticated the inspection point, the end point (e.g., 210b of FIG. 2) may provide session keys or other information based on permissions established by the directory service. In this regard, a secure channel (e.g., utilizing IPSec, secure socket layer (SSL) and/or transport layer security (TLS)) may be utilized to exchange IPSec session keys and/or other secure information between the end point and the inspection point.

In some cases, an end point without native support for MACsec may be attached to a MACsec network. Accordingly, an inspection point that can authenticate itself to the rest of the network (e.g. a MACsec trusted entity, a directory repository) may serve as a proxy into the MACsec network. The endpoint may authenticate itself to the inspection point using any mechanism (e.g. 802.1x or enhanced 8021x as described above), and the inspection point may proxy the endpoint into the 802.1af based MACsec network. This may be assisted by a discovery mechanism to detect the boundaries of the MACsec network.

As MACsec is a hop by hop protocol, it lacks the ability to enable a true end-to-end security or authentication. Accordingly, use of a NIHW device in establishing end to end authentication and/or encryption to a participating end point that supports authenticated and/or encryption may allow end to end authentication and/or encryption over combination of IPSec and MACsec networks. This may enable an end point to report to an application (e.g. using a special API) that such an end to end protection is supported. This is normally not possible with MACsec based network, eliminating important usage models.

In some cases such API are missing even for an IPsec based network. Accordingly, allowing the NIHW device or some software on the end point to expose to the OS, hypervisor, and/or an application that the security services are deployed end to end, may allow the application to rely on network security services that may be provided in a lower layer of the communication stack and may not require use of a special transport port (e.g. SSL) or attempt to use end to end security from the application itself. In some embodiments of the invention, use of the inspection point, directory services, and/or discovery protocols may be required to allow discovery of the location of a remote peer and whether network security is properly deployed end to end.

Aspects of a method and system for traffic engineering in an IPSec secured network (e.g. network 200 of FIG. 2) are provided. In this regard, a node (e.g., node 202a) in a network may be authenticated as a trusted third party, and that trusted third party may be enabled to acquire security information shared between a plurality of network entities (e.g., the end point 210a and the server 206). In this manner, the node (202a) may parse IPSec encrypted traffic communicated between the plurality of network entities (210a and 208). Exemplary shared security information may comprise one or more session keys utilized for encrypting and/or decrypting the IPSec secured traffic. In this regard, decrypted traffic may be restricted to the authenticated node and not communicated to other nodes. The node (202a) may register with a directory service and the directory service may authenticate the node and determine what security information the third party should have access to. Additionally, one or more of the network entities (210 and 208) may authenticate the node and share the security information with the node via one or more secure channels. In this regard, the entities may authenticate the node based on a certificate provided to the node by a directory service. The network entities may be queried to provide explicit approval prior to authenticating the node as a trusted third party. The entities may occasionally update the node with the latest security information. The node may parse IPSec traffic and identify a flow associated with the IPsec traffic. In this manner, the node (202a) may generate and/or communicate statistics pertaining to said IPSec secured traffic based on the flow with which the traffic is associated. The IPSec traffic that the node (202a) parses may be determined based on a time division multiplexing scheme, for example. In various embodiments of the invention, the security information may be exchanged between the network entities and the node via a three-way key negotiation protocol (e.g., via a propriety extension to Kerberos, KINK, IKE, etc.). In other embodiments of the invention the security information may be exchanged via a bilateral negotiation between, for example, end points and subsequently reported to an authenticated third party node.

In various embodiments of the invention the authenticated third party node (e.g., 202a) may enable establishing end-to-end trust between two network entities (e.g., 210a and 206) and may be enabled to report that such end-to-end trust may be in place.

In various embodiments of the invention, the authenticated third party node (e.g., 202a) may function as a proxy between portions of a network utilizing different security protocols. In this regard, the node may comprise a security module (e.g., 308) that may be enabled to handle multiple security protocols such as MACSec and IPSec. In this regard, the security module may comprise common hardware utilized for handling various security protocols.

In various embodiments of the invention, the authenticated node may be enabled to perform MAC based authentication of multiple MAC addresses on a single network port. In this manner, an authenticated node may prevent non-authenticated entities from utilizing an authenticated port for conveying data in a network.

In various embodiments of the invention, a node (e.g. 202b) may be authenticated as an authorized third party and encrypted traffic may be transmitted to the authenticated node. However, in instances where the node (202b) may not be provided with security information, an end point (e.g., 210b) sending encrypted traffic to the node may also send flow information pertaining to the encrypted traffic. In this manner, the node (202b) may still process the traffic based on a flow with which the traffic is associated even though the node (202b) may be unable to decrypt the traffic. Accordingly, traffic engineering functions may be distributed among a plurality of nodes in a network and secure information shared with a authorized third party node may differ depending on the network, the nodes involved, the traffic involved, etc.

Another embodiment of the invention may provide a machine-readable storage, having stored thereon, a computer program having at least one code section executable by a machine, thereby causing the machine to perform the steps as described herein for traffic engineering in an IPSec secured network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A network device comprising:
   circuitry configured to
   receive encrypted IPSec secured traffic;
   receive flow information corresponding to the encrypted IPSec secured traffic at the network device for handling the encrypted IPSec secured traffic; and
   forward the encrypted IPSec secured traffic without decrypting the encrypted IPSec secured traffic based at least in part on the flow information.

2. The network device of claim 1, wherein the network device is authenticated by another network device in a network as being a trusted third party.

3. The network device of claim 2, wherein the circuitry is configured to receive the IPSec secured traffic from the another network device.

4. The network device of claim 1, wherein the circuitry is configured to register the network device with a directory service.

5. The network device of claim 4, wherein the circuitry is configured to authenticate the network device with the directory service.

6. The network device of claim 5, wherein the circuitry is configured to transmit information received from the directory service as a result of the authentication to another network device from which the IPSec secured traffic is received.

7. The network device of claim 6, wherein the information received from the directory service as a result of the authentication is a certificate.

8. The network device of claim 1, wherein the circuitry is configured to parse IPSec secured traffic based at least in part on the flow information.

9. The network device of claim 8, wherein the circuitry is configured to time division multiplex the parsed IPSec secured traffic.

10. The network device of claim 1, wherein the circuitry is configured to exchange security information with another network device via a three-way key negotiation protocol.

11. The network device of claim 1, wherein the circuitry is configured to share security information with another network device via a bilateral negotiation.

12. The network device of claim 1, wherein the circuitry is configured to establish an end-to-end trust between the network device and at least one of a plurality of other network devices without security information.

13. The network device of claim 1, wherein the flow information is communicated via a NetFlow protocol or an Internet Protocol Flow Information Export (IPFIX) protocol.

14. The network device of claim 1, wherein the flow information comprises at least one of a source IP address or a destination IP address.

15. The network device of claim 1, wherein the flow information comprises at least one of upper protocol ports or a requested bandwidth.

16. The network device of claim 1, wherein the flow information comprises at least one of a keyword used in data included in a payload of the encrypted IPSec secured traffic or a result of a search for a keyword of the payload of the encrypted IPSec secured traffic prior to encryption.

17. The network device of claim 1, wherein a header and a payload of the IPSec secured traffic is encrypted, and the flow information is distinct from header information included in the header of the IPSec secured traffic.

18. The network device of claim 1, wherein the circuitry is configured to perform at least one of enforcing network policies, providing traffic statistics or communicating with management entities based at least in part on the flow information.

19. A method performed by a network device, the method comprising:
   receiving encrypted IPSec secured traffic;
   receiving flow information corresponding to the encrypted IPSec secured traffic at the network device for handling the encrypted IPSec secured traffic; and
   forwarding the encrypted IPSec secured traffic without decrypting the encrypted IPSec secured traffic based at least in part on the flow information.

20. A network device comprising:
   circuitry configured to
   control performing authentication with a second network device remote from the network device;
   receive authentication information from the second network device based on the authentication;
   control performing authentication with a third network device based on the authentication information received from the second network device;
   receive encrypted IPSec secured traffic from the third network device;
   receive flow information pertaining to the encrypted IPSec secured traffic from the third network device for handling the encrypted IPSec secured traffic; and
   forward the encrypted IPSec secured traffic without decrypting the encrypted IPSec secured traffic based at least in part on the flow information.

* * * * *